No. 840,351. PATENTED JAN. 1, 1907.
H. J. LORMIS.
HAY LOADER.
APPLICATION FILED SEPT. 6, 1906.

Witnesses
W. S. Rockwell
Hy E. Chandler

Inventor
Harry J. Lormis
By Chandler & Chandler
Attorneys

No. 840,351. PATENTED JAN. 1, 1907.
H. J. LORMIS.
HAY LOADER.
APPLICATION FILED SEPT. 6, 1906.

2 SHEETS—SHEET 2.

UNITED STATES PATENT OFFICE.

HARRY J. LORMIS, OF MAGNOLIA, ILLINOIS.

HAY-LOADER.

No. 840,351.     Specification of Letters Patent.     Patented Jan. 1, 1907.

Application filed September 6, 1906. Serial No. 333,518.

*To all whom it may concern:*

Be it known that I, HARRY J. LORMIS, a citizen of the United States, residing at Magnolia, in the county of Putnam, State of Illinois, have invented certain new and useful Improvements in Hay-Loaders; and I do hereby declare the following to be a full, clear, and exact description of the invention, such as will enable others skilled in the art to which it appertains to make and use the same.

This invention has reference to hay-loaders, and especially to machines of the type comprising a wheeled platform provided with conveyer-belts for carrying the hay upward and depositing it in a wagon to which the machine is attached.

The particular improvements consist in the formation of a transverse opening in the platform directly beyond the upper end of the platform-chains, through which the hay falls into the wagon, and in the provision of a table secured to the upper end of the platform and carrying a series of spiked chains to engage the hay and properly pack the wagon.

The invention further comprises the construction, combination, and arrangement of parts, all as hereinafter fully described, specifically claimed, and illustrated in the accompanying drawings, in which—

Figure 3:
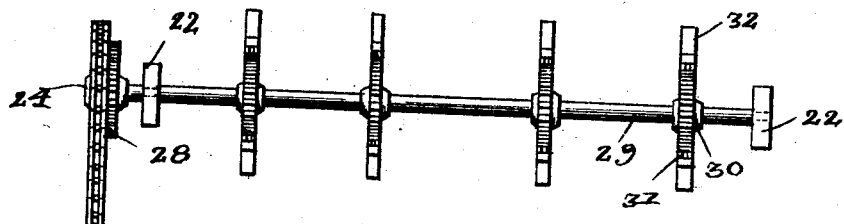
Figure 4:
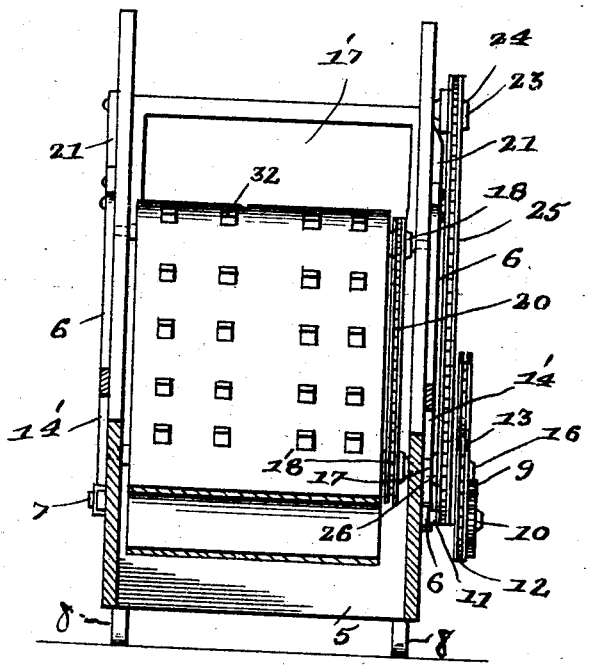

Figure 1 is a side elevation of the improved hay-loader, showing also a portion of the wagon to which the loader is connected. Fig. 2 is a top plan view of Fig. 1. Fig. 3 is a vertical transverse section taken on the line 3 3 of Fig. 2 through the table. Fig. 4 is a vertical transverse section taken on the line 4 4 of Fig. 2.

Like parts are designated by similar reference-numerals in the several views.

Referring to the drawings, the machine is shown as comprising a trough-shape inclined receiving-platform 5, mounted on elbow-braces 6, pivoted upon the main axle 7, which last is provided at opposite ends with traction-wheels 8. Axle 7 is further provided with a gear 9 in mesh with the outer member 10 of a double gear mounted upon the stub-shaft 11, journaled in the lower member of the corresponding elbow-brace. The inner member 12 of said double gear is connected by a chain 13 with a sprocket-gear 14, mounted upon one end of a stub-shaft 15, journaled in a vertical bracket 14', secured to the adjacent side piece of the receiving-platform, said chain likewise passing over and driving the outer member 16 of a second double gear mounted upon a transverse shaft 17, journaled in opposite sides of the receiving-platform.

The receiving-platform has a transverse opening 17' formed in its bottom portion and located toward the upper end thereof, the opening being of sufficient size to permit the hay, which is drawn up the platform by the action of the spiked platform-chains 20, to fall therethrough onto the wagon, with which the loader is connected. Chains 20 pass over sprockets 18, provided upon transverse shafts 19, journaled in the platform sides, and over sprocket 18', carried by the shafts 17, the latter forming the driving means for the chains, of which any suitable number may be employed, there being three shown in the present instance.

Secured to the upper end of the receiving-platform by means of braces 21 is a horizontally-disposed table comprising oppositely-disposed U-shaped strips 22, connected at opposite ends by transverse shafts 23 23', the former of which extends at one end beyond its strip 22 and carries upon such extension a sprocket-gear 24, connected by a chain 25 with the rear member 26 of the upper double gear. Shaft 23 is further provided upon its extended end with a gear 27, in mesh with a gear 28, carried by a transverse shaft 29, said last-mentioned shaft carrying a series of sprocket-wheels 30, connected by the sprocket-chains 31 with the sprocket-wheels 30', carried by the shaft 23', located at the rear end of the table.

The chains 31 carry fingers 32 similar to those upon the platform-chains 20.

Owing to the pivotal relation between the platform and axle and the eccentric mounting of the lower double gear with respect to the latter, it will be necessary to provide means for retaining the chain 13 taut in all positions of the platform, and to this end the bracket 14' is pivotally mounted upon the platform side and retained in adjusted position by a thumb-screw or other preferred means.

The machine, as shown in Figs. 1 and 2, is so connected with the wagon that the table extends some distance beyond the front end thereof, being disposed at about ten or twelve inches above the upper edges of the wagon sides.

Upon a forward movement in any direction of the wagon and machine the rotation of the axle of the latter will be communicated to the platform-chains through the medium of the chain 13, the upper double gear, and the sprocket-gears 18' on the shaft 17 of the latter, the rotation of said chains driving the table-chains 30 through chain 25 and the sprockets 27 and 28.

The hay, which is tossed from the haycocks onto the receiving-platform, will therefore be carried up by the platform-chains and dropped through the opening 17' onto the wagon. When the hay has been piled sufficiently high in the wagon to contact with the fingers on the table-chains, the latter will force the hay back toward the rear end of the wagon, thus packing the same and loading the wagon to its fullest extent.

Modifications and changes may obviously be made in the size and proportions of the various parts and in other minor details of construction without departing from the spirit of the invention.

What is claimed is—

1. A hay-loader adapted to be secured to a wagon and comprising in combination an inclined receiving-platform having a transverse opening adjacent its upper end; a conveyer-belt carried by said platform and extending up to said opening to discharge the hay therethrough onto the wagon; a table secured to the upper end of said platform and extending over the front end of the wagon when the loader is attached to the wagon, and movable means carried by said platform adapted to engage the hay discharged onto the wagon and force the same toward the rear end thereof.

2. A hay-loader adapted to be secured to a wagon and comprising in combination an inclined receiving-platform having a transverse opening adjacent its upper end; a conveyer-belt carried by said platform and extending up to said opening to discharge the hay therethrough onto the wagon; a table secured to the upper end of said platform and extending over the front end of the wagon when the loader is attached to the wagon, and a conveyer-belt carried by said table and provided with fingers adapted upon movement of the belt to engage discharged hay and force the same toward the rear end of the wagon.

3. A hay-loader adapted to be attached to a wagon and comprising in combination an inclined receiving-platform having a transverse opening adjacent its upper end; a conveyer-belt carried by said platform and extending to discharge the hay therethrough onto the wagon; a table secured to the upper end of said platform and extending over the front end of the wagon when the loader is attached to the wagon; a conveyer-belt carried by said table and provided with fingers and means for rotating said conveyer-belts in opposite directions whereby the end stretch of said table conveyer-belt is adapted to engage the discharged hay and force the same toward the rear end of the wagon.

In testimony whereof I affix my signature in presence of two witnesses.

HARRY J. LORMIS.

Witnesses:
   E. O. HALL,
   MATTHEW STEELE.